US012325519B2

(12) United States Patent
Ibacoglu et al.

(10) Patent No.: US 12,325,519 B2
(45) Date of Patent: Jun. 10, 2025

(54) AIR VEHICLE

(71) Applicant: TUSAS—TURK HAVACILIK VE UZAY SANAYII ANONIM SIRKETI, Ankara (AR)

(72) Inventors: Hasan Ibacoglu, Ankara (AR); Burhan Sahin, Ankara (AR)

(73) Assignee: TUSAS- TURK HAVACILIK VE UZAY SANAYII ANONIM SIRKETI, Ankara (TR)

( * ) Notice: Subject to any disclaimer, the term of this patent is extended or adjusted under 35 U.S.C. 154(b) by 20 days.

(21) Appl. No.: 18/368,844

(22) Filed: Sep. 15, 2023

(65) Prior Publication Data

US 2024/0109659 A1  Apr. 4, 2024

(30) Foreign Application Priority Data

Sep. 30, 2022  (TR) .............................. 2022/015038

(51) Int. Cl.
| | |
|---|---|
| *B64C 39/12* | (2006.01) |
| *B64C 5/04* | (2006.01) |
| *B64C 5/16* | (2006.01) |
| *B64C 5/18* | (2006.01) |

(52) U.S. Cl.
CPC ................ *B64C 39/12* (2013.01); *B64C 5/04* (2013.01); *B64C 5/16* (2013.01); *B64C 5/18* (2013.01)

(58) Field of Classification Search
CPC .. B64C 39/12; B64C 3/42; B64C 3/56; B64C 3/54; B64C 3/38; B64C 3/385; B64C 5/04; B64C 5/10; B64C 5/16
See application file for complete search history.

(56) References Cited

U.S. PATENT DOCUMENTS

| 6,098,927 A | 8/2000 | Gevers | |
|---|---|---|---|
| 2015/0102155 A1* | 4/2015 | Krastev .................. | B60K 16/00 244/2 |

\* cited by examiner

*Primary Examiner* — Timothy D Collins
*Assistant Examiner* — Terri L Filosi
(74) *Attorney, Agent, or Firm* — Notaro, Michalos & Zaccaria P.C

(57) ABSTRACT

An air vehicle has a body, more than one wing located on the body creating a lifting force, at least one control surface located on the wing and movable along the direction in which the wing extends, an open position in which the control surface moves out of the wing in the direction in which the wing extends and increases the lifting force acting on the body, a closed position in which the control surface is moved from the open position and brought to the wing, a main actuator moving the control surface between the open and closed positions, at least one shaft enabling the control surface to be moved with the triggering of the main actuator and having one end connected to the control surface, and at least one additional actuator enabling the attack angle of the wings to be changed by rotating the wings on the body.

12 Claims, 4 Drawing Sheets

AIR VEHICLE

CROSS-REFERENCE TO RELATED APPLICATION

This application claims priority to Turkish Patent Application No. 2022/015038, filed Sep. 30, 2022, which is incorporated herein by reference.

FIELD

This invention relates to wing structures that are located in air vehicles in an extensible manner.

BACKGROUND

In air vehicles, wing structures are used to create the lifting force required by the vehicle at the relevant flight speed. It is preferred that the wing area is higher so that the vehicle can produce the desired lifting force without losing grip at low speeds. However, at high speeds, large wing areas are not preferred because they cause high drag. For this reason, telescopic wings are used to increase the lifting force at low speeds and to reduce wing drag at high speeds.

The United States patent document U.S. Pat. No. 6,098,927A, which is included in the known state of the art, describes an alternative method for extending and retracting wing extension panels. The air vehicle developed according to that patent document is provided with a leadscrew extending from one end of the fixed wing section to the other end thereof. With the operation of the drive motor which is coupled to the leadscrew, the wing extension panels in the wing are extended or retracted.

SUMMARY

An air vehicle developed by this invention enables the flight characteristic to be changed by increasing or decreasing the air vehicle wing surface area with the movement of the control surfaces during flight.

Another object of the present invention is to reduce the weight of the system that enables the movement of the control surfaces used for changing the wing surface area and to ensure a safer operation thereof.

The air vehicle realized to achieve the object of the invention, defined in the first claim and in the claims dependent thereon, comprises a body and more than one wing extending outward from the body and providing lifting force to the air vehicle, a control surface located on the wing in a movable manner and increasing or decreasing the lifting force provided by the wing to the body by extending outwardly from the wing or moving towards the wing. The control surface has an open position in which the control surface extends outwardly from the wing to increase the wing's aerodynamic surface and a closed position in which the control surface is pulled towards the wing by moving it on the wing. The control surface is moved between the open position and the closed position by means of a main actuator. At least one shaft that moves the control surface on the wing with the motion input it receives from the main actuator. By means of at least one additional actuator on the body, it is enabled to change the attack angles by moving the wings relative to the body.

By attaching the wings to the body and triggering the additional actuator, the air vehicle of the invention comprises a support element that enables the attack angles to be changed by transmitting the additional actuator input to the wings and moving the wings relative to the body. Thanks to an opening provided in the support element, the shaft can contact the control surface by extending through the support element into the wing. Thanks to passing the shaft through the opening provided in the support element that allows the wings to be rotated relative to the body, the attack angles of the wings are changed by the support element, while the control surfaces are triggered independently of the wing movement, enabling them to move between the open position and the closed position.

In an embodiment of the invention, the air vehicle comprises a shaft extending along the wings mutually located on the body and simultaneously triggering the control surfaces by rotating about the axis on which it extends, thereby enabling the control surfaces to move telescopically from the open position to the closed position or from the closed position to the open position.

In an embodiment of the invention, the air vehicle comprises a worm gear extending outwardly from the shaft and located around the shaft, a threaded channel located within the control surface, sliding within the worm gear and allowing the control surface to be moved.

In an embodiment of the invention, the air vehicle comprises a single shaft triggering the mutual control surfaces and enabling a simultaneous extending of both control surfaces thanks to the worm gear located on the shaft in the opposite direction to each other at the ends of the shaft in contact with the mutual control surfaces.

In an embodiment of the invention, the air vehicle comprises an intermediate element extending outwardly from the support element so as to contact the support element and enabling the attack angle of the wings to be changed by transmitting the movement input of the additional actuator to the support element.

In an embodiment of the invention, the air vehicle comprises at least one extension extending outwardly over the support element and having a threaded form, at least one recess located on the surface on which the intermediate element contacts the extension, and contacting the extension in a form fitting manner so as to enable the movement of the additional actuator to be transferred.

In an embodiment of the invention, the air vehicle comprises at least one bracket between the wing and the body to carry the wing, at least one bearing between the bracket and the support element and providing the mounting of the wing to enable the rotation of the wing with respect to the body.

In an embodiment of the invention, the air vehicle comprises a control unit that enables a simultaneous triggering of the control surface and the wings by controlling the main actuator and the additional actuator during the flight of the air vehicle.

In an embodiment of the invention, the air vehicle comprises a main actuator operating like a step motor.

In an embodiment of the invention, the air vehicle comprises an additional actuator operating like a linear actuator.

In an embodiment of the invention, the air vehicle comprises a wing positioned in the nose region according to the flight direction of the body and acting as a canard.

In an embodiment of the invention, the air vehicle comprises more than one shaft on the body without contacting each other and more than one main actuator triggering the shafts for each control surface on the body.

In an embodiment of the invention, the air vehicle comprises a single main actuator located on a single shaft triggering the mutual control surfaces.

BRIEF DESCRIPTION OF THE DRAWINGS

The air vehicle realized to achieve the object of the present invention is shown in the accompanying figures, wherein from these figures.

Figure 1:
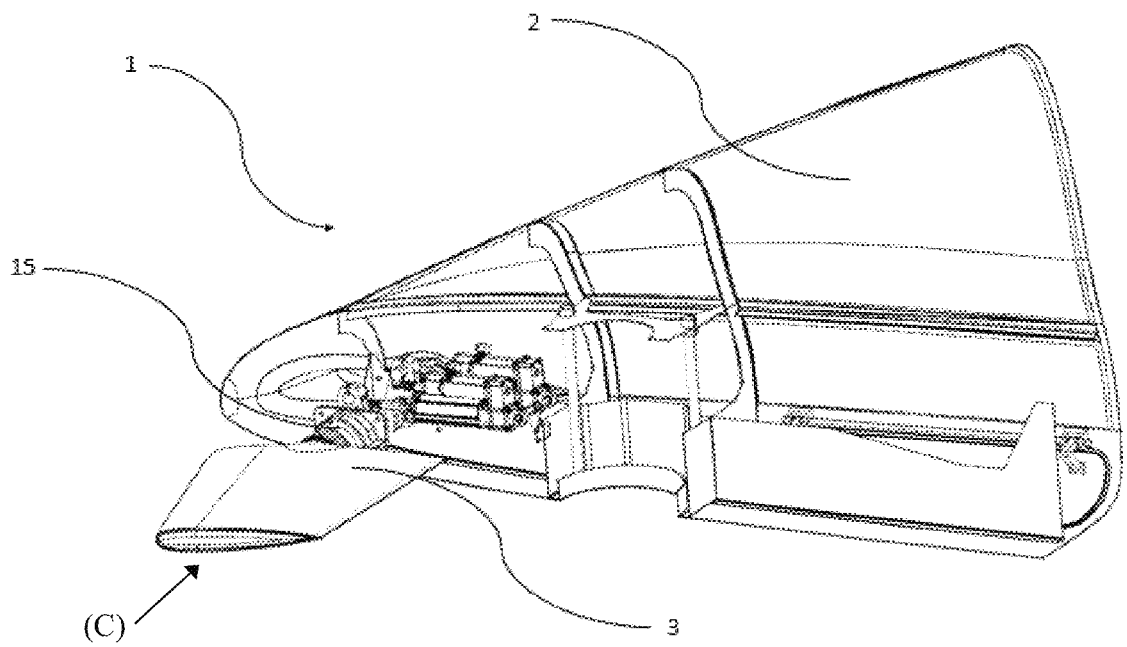
FIG. 1 is a cross-sectional view of the air vehicle's closed position (C).

The parts in the figures are individually numbered and the equivalents of these numbers are given below.
1. Air Vehicle
2. Body
3. Wing
4. Control Surface
5. Main Actuator
6. Shaft
7. Additional Actuator
8. Support Element
9. Opening
10. Worm Gear
11. Threaded Channel
12. Intermediate element
13. Extension
14. Recess
15. Bracket
16. Bearing
17. Control Unit
(O) Open Position
(C) Closed Position

DETAILED DESCRIPTION

The air vehicle (1) comprises a body (2), more than one wing (3) located on the body (2) and creating a lifting force for the flight of the body (2), at least one control surface (4) located on the wing (3) and movable along the direction in which the wing (3) extends, an open position (O) in which the control surface (4) moves out of the wing (3) in the direction in which the wing (3) extends and increases the lifting force acting on the body (2), a closed position (C) in which the control surface (4) is moved from the open position (O) and brought to the wing (3), a main actuator (5) moving the control surface (4) between the open position (O) and the closed position (C), at least one shaft (6) enabling the control surface (4) to be moved with the triggering of the main actuator (5) and having one end connected to the control surface (4), and at least one additional actuator (7) enabling the attack angle of the wings (3) to be changed by rotating the wings (3) on the body (2).

Figure 2:
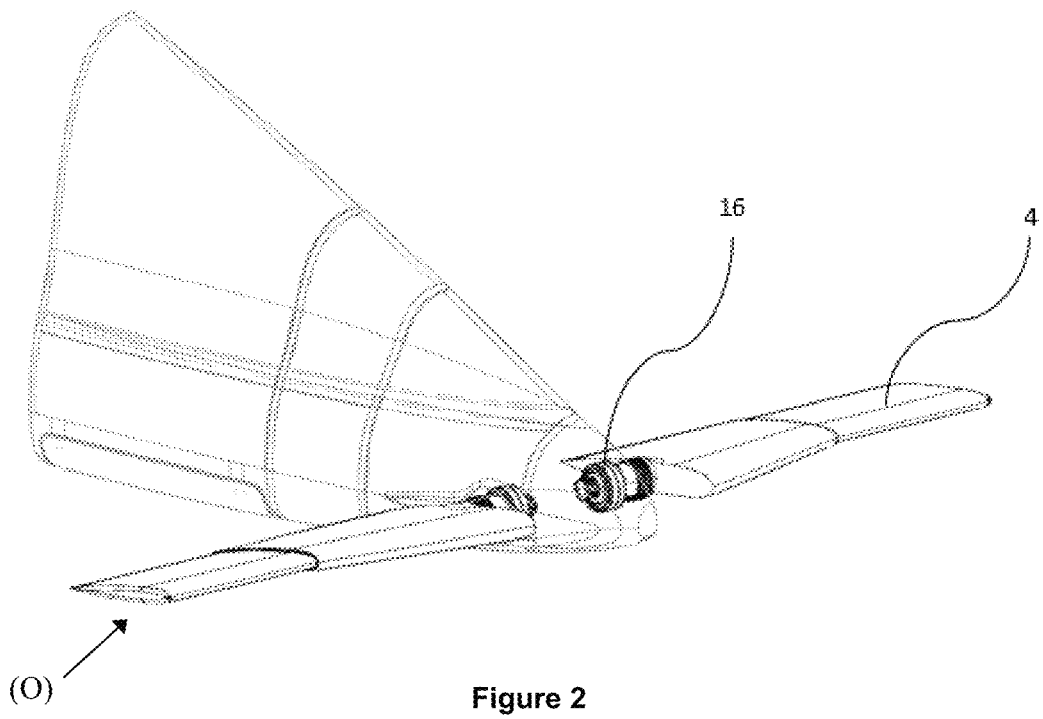
FIG. 2 is a perspective view of the air vehicle's opened position (O).
Figure 4:
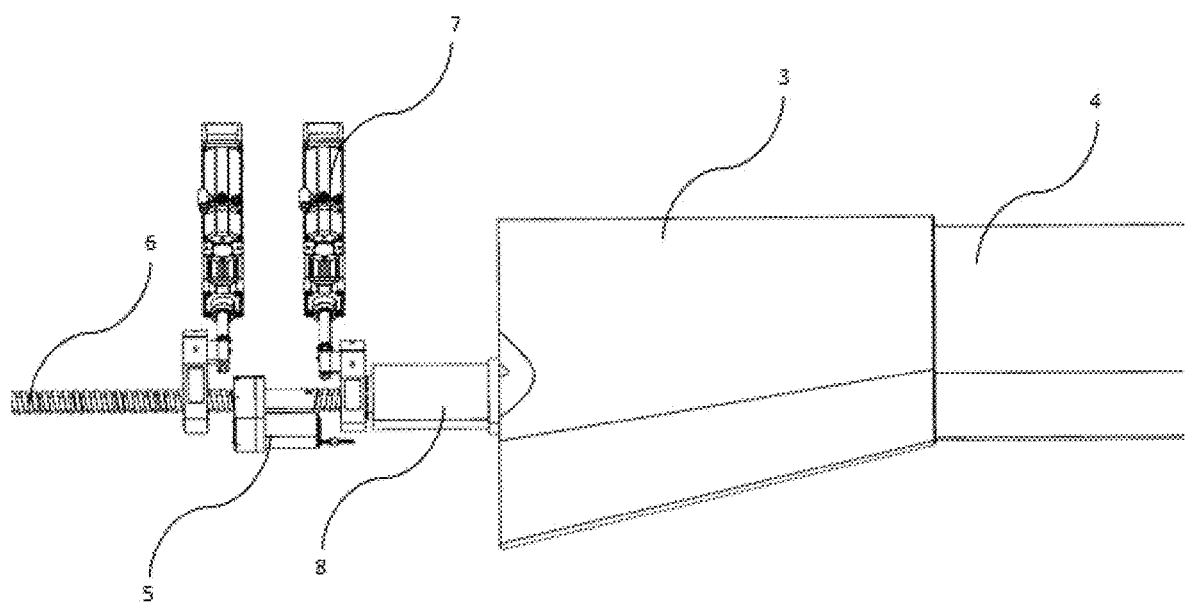
FIG. 4 is a top view of the main actuator, additional actuator, and shaft.

The air vehicle (1) of the invention comprises at least one support element (8) located on the wing (3) and enabling the wing (3) to be movably connected onto the body (2), an opening (9) extending thoroughly within the support element (8) and enabling the shaft (6) to trigger the control surface (4), an additional actuator (7) located in connection with the support element (8) and enabling the wings (3) to be rotated around the shaft (6) located within the opening (9) by triggering the support element (8), the shaft (6) rotating around its axis along the direction in which it extends within the support element (8) and extending from the opening (9) towards the control surface (4), enabling the control surface (4) to be extended telescopically outward from the wing (3) with the main actuator (5) triggering the control surface (4) and thus enabling the control surface (4) to be moved between the open position (O) and the closed position (C) irrespective of the additional actuator (7) triggering the wing (3) or wings (3). (FIG. 1, FIG. 2, FIG. 4).

Thanks to the control surface (4) attached to the wing (3) in a movable manner, when the control surface (4) switches to the open position, the lifting force provided by the wing (3) to the body (2) is increased and the control surface (4) is brought to the closed position by retracting the control surface (4) towards the wing (3). It is enabled that the control surface (4) moves on the wing (3) by means of the shaft (6) on the body (2) and the main actuator (5) triggering the shaft (6). With the additional actuator (7), the attack angles of the wings (3) are changed.

The body (2) is provided with a support element (8) extending outward from the wing (3) and enabling the shaft (6) to contact the control surface (4) through the opening (9) located therein. However, the support element (8) enables the attack angle of the wing (3) to be changed by means of the additional actuator (7). Thanks to the shaft (6) passing through the opening (9) in the rotation axis of the support element (8), it is enabled that the control surfaces (4) are triggered independently of the support element (8) rotating the wing (3) and without being affected by the rotation of the wing (3) by the support element (8).

Figure 3:
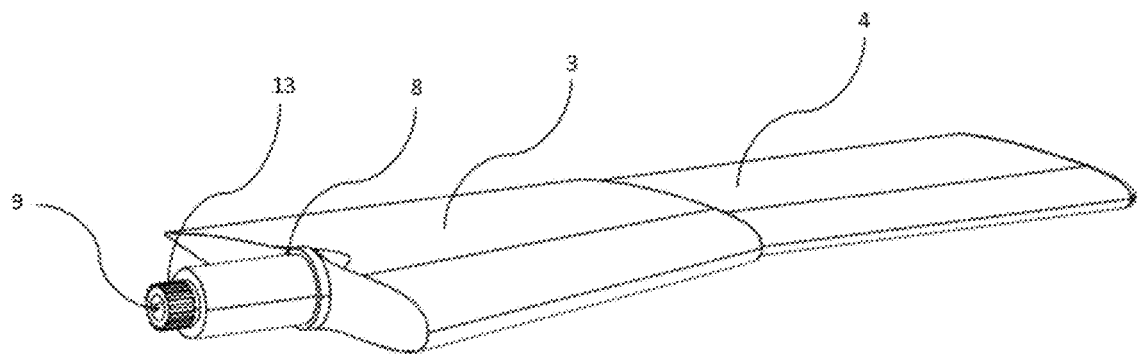
FIG. 3 is a perspective view of the wing, support member, and opening.

In an embodiment of the invention, the air vehicle (1) comprises the shaft (6) extending along the wings (3) mutually located on the body (2), rotating in the opening (9) and triggering the mutual control surfaces (4), thereby enabling the mutual control surfaces (4) to perform a simultaneous telescopic motion and enabling the attack angles of the wings (3) to be changed around the axis in which it extends through the opening (9) and the mutual wings (3) to be triggered independently of each other. By passing the mutual support elements (8) of the shaft (6) through the rotation axis, it is enabled that the mutual control surfaces (4) are simultaneously triggered by using a single shaft (6). (FIG. 3).

Figure 7:
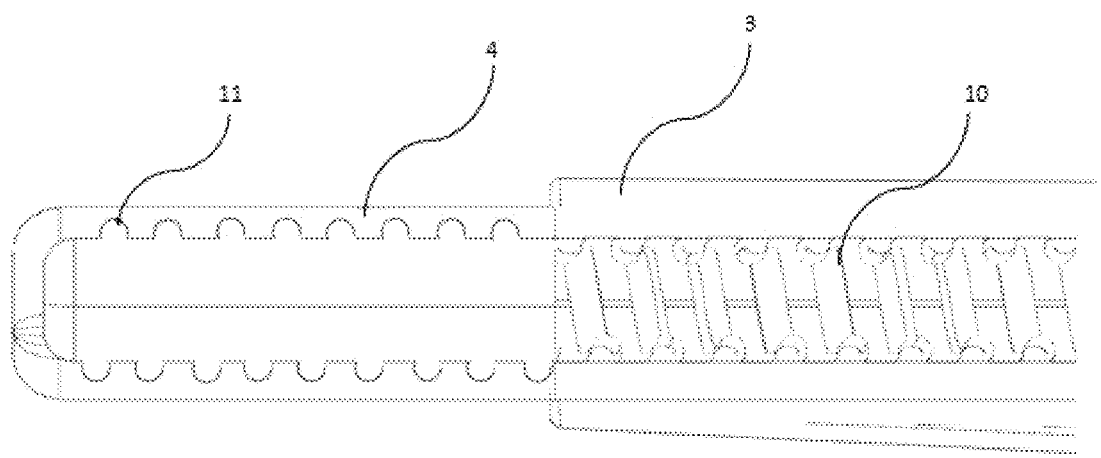
FIG. 7 is a cross-sectional view of the threaded channel and worm gear.

In an embodiment of the invention, the air vehicle (1) comprises a worm gear (10) located on the shaft (6), a threaded channel (11) located in the control surface (4) in a form fitting manner with the worm gear (10), and a control surface (4) coming to the open position (O) or the closed position (C) by moving along the direction in which it extends on the wing (3) with the worm gear (10) moving in the threaded channel (11) as a result of the shaft (6) being triggered by the main actuator (5). It is enabled that the control surface (4) is moved by rotating it only on the axis in which the shaft (6) extends by means of the worm gear (10) and the threaded channel (11) provided on the control surface (4) in a form fitting manner with the worm gear (10). (FIG. 7).

In an embodiment of the invention, the air vehicle (1) comprises worm gears (10) that trigger the control surfaces (4) mutually located on the body (2) and thereby enable the mutual control surfaces (4) to simultaneously switch only to the open position (O) and/or only to the closed position (C) and are located in an opposite direction with respect to each other on the shaft (6) for each mutual control surfaces (4). Thanks to the worm gear (10) located on the shaft (6) in the opposite direction to each other at the ends of the shaft (6)

in contact with the mutual control surfaces (4), it is enabled that the control surface (4) is triggered using only one shaft (6).

Figure 5:
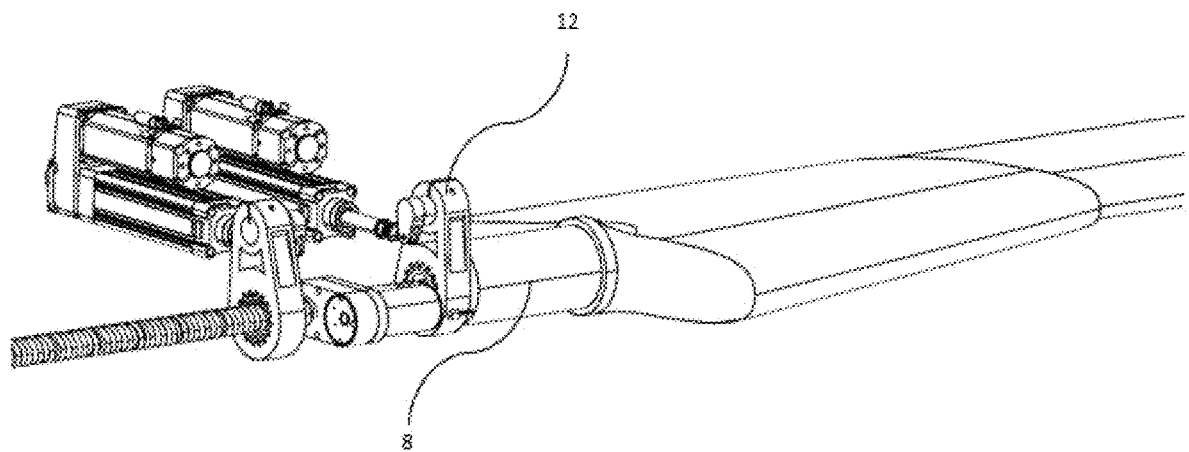
FIG. 5 is a perspective view of the intermediate element and the support element.

In an embodiment of the invention, the air vehicle (1) comprises at least one intermediate element (12) extending outwardly from the support element (8) so as to contact the additional actuator (7), enabling the support element (8) to be rotated by being triggered by the additional actuator (7). Thanks to the intermediate element (12), it is enabled that the linear movement of the additional actuator (7) is used to rotate the support element (8) and thus to change the attack angles of the wings (3). (FIG. 5).

In an embodiment of the invention, the air vehicle (1) comprises at least one extension (13) located on the support element (8) and extending outwardly from the support element (8), at least one recess (14) located on the intermediate element (12) in a form fitting manner with the extension (13) and enabling the movement of the additional actuator (7) to be transmitted to the wings (3) by contacting the extension (13). Thanks to the extension (13) and the recess (14), the motion transfer surface used to transfer the motion input applied by the additional actuator (7) to the support element (8) is increased.

In an embodiment of the invention, the air vehicle (1) comprises at least one bracket (15) located between the wing (3) and the body (2), at least one bearing (16) in the bracket (15), enabling to position the wing (3) rotatably relative to the body (2) around the axis in which it is connected to the body (2) and located on the support element (8) so as to surround the support element (8). Thanks to the bracket (15) and the bearing (16), it is enabled that the wing (3) is placed on the body (2) and mounted there.

Figure 6:
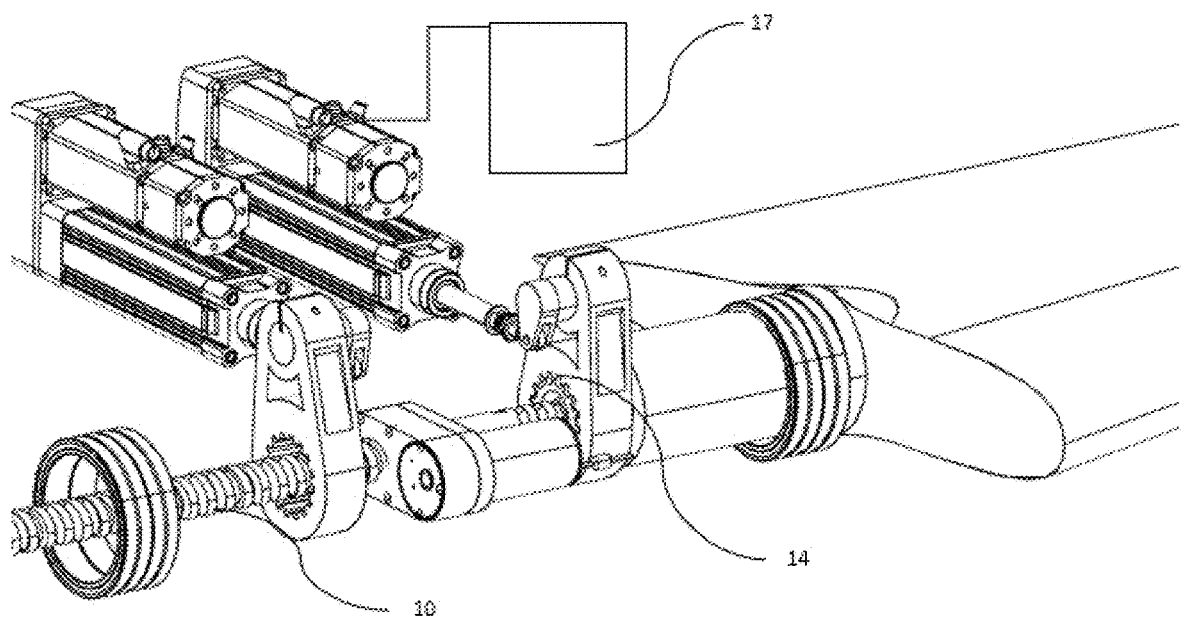
FIG. 6 is a perspective view of the shaft and recess.

In an embodiment of the invention, the air vehicle (1) comprises a control unit (17) that enables the control surface (4) to move between the open position (O) and the closed position (C) simultaneously by changing the attack angle of the wings (3) by triggering the main actuator (5) and the additional actuator (7). By means of the control unit (17), the position of the wing (3) during flight and the movement of the control surface (4) and the lifting force it provides to the body (2) can be controlled. (FIG. 6).

In an embodiment of the invention, the air vehicle (1) comprises a main actuator (5) which is a step motor. Thanks to the step motor, the rotation angle of the shaft (6) and therefore the amount of outward extension of the control surface (4) from the wing (3) can be controlled.

In an embodiment of the invention, the air vehicle (1) comprises an additional actuator (7) which is a linear actuator.

In an embodiment of the invention, the air vehicle (1) comprises a wing (3) located in the nose region of the body (2) and acting as a canard. Thanks to the control surface (4) used in the canard, it is enabled that the lifting force applied to the front part of the air vehicle (1) during flight is changed.

In an embodiment of the invention, the air vehicle (1) comprises more than one shaft (6) located on the body (2) without contacting each other and enabling each control surface (4) to be controlled independently of each other, more than one main actuator (5) enabling each shaft (6) to be triggered independently of each other. Thanks to more than one main actuator (5) and shaft (6), it is enabled that each control surface (4) on the air vehicle (1) is controlled independently of each other.

In an embodiment of the invention, the air vehicle (1) comprises a shaft (6) that moves both control surfaces (4) by being triggered by the control unit (17) of a single main actuator (5). In this way, the number of main actuators (5) used on the air vehicle (1) is reduced and the weight of the air vehicle (1) can be reduced.

We claim:

1. An air vehicle (1) comprising:
   a body (2),
   a wing (3) located on the body (2) and creating a lifting force for flight of the body (2),
   a control surface (4) located on the wing (3) and movable along a direction in which the wing (3) extends, the control surface (4) having an open position (O) in which the control surface (4) moves out of the wing (3) along the direction in which the wing (3) extends and increases the lifting force acting on the body (2) and a closed position (C) in which the control surface (4) is moved from the open position (O) and brought into the wing (3),
   a main actuator (5) moving the control surface (4) between the open position (O) and the closed position (C),
   at least one shaft (6) enabling the control surface (4) to be moved with triggering of the main actuator (5) and having one end connected to the control surface (4), and
   an additional actuator (7) enabling an attack angle of the wing (3) to be changed by rotating the wing (3) on the body (2),
   a support element (8) located on the wing (3) and enabling the wing (3) to be movably connected onto the body (2), an opening (9) extending thoroughly within the support element (8) and enabling the shaft (6) to trigger the control surface (4), and
   wherein the additional actuator (7) is located in connection with the support element (8) and enables the wing (3) to be rotated around the shaft (6) located within the opening (9) by triggering the support element (8), the shaft (6) rotating around an axis thereof along a direction in which the shaft (6) extends within the support element (8) and extending from the opening (9) towards the control surface (4), enabling the control surface (4) to be extended telescopically outward from the wing (3) with the main actuator (5) triggering the control surface (4) and thus enabling the control surface (4) to be moved between the open position (O) and the closed position (C) irrespective of the additional actuator (7) triggering the wing (3).

2. The air vehicle (1) according to claim 1, comprising a worm gear (10) located on the shaft (6), a threaded channel (11) located in the control surface (4) in a form fitting manner with the worm gear (10), and the control surface (4) coming to the open position (O) or the closed position (C) by moving along the direction in which the control surface (4) extends on the wing (3) with the worm gear (10) moving in the threaded channel (11) as a result of the shaft (6) being triggered by the main actuator (5).

3. The air vehicle (1) according to claim 1, comprising at least one intermediate element (12) extending outwardly from the support element (8) so as to contact the additional actuator (7), enabling the support element (8) to be rotated by being triggered by the additional actuator (7).

4. The air vehicle (1) according to claim 3, comprising at least one extension (13) located on the support element (8) and extending outwardly from the support element (8), at least one recess (14) located on the intermediate element (12) in a form fitting manner with the extension (13) and enabling the movement of the additional actuator (7) to be transmitted to the wing (3) by contacting the extension (13).

5. The air vehicle (1) according to claim 1, comprising at least one bracket (15) located between the wing (3) and the body (2), at least one bearing (16) in the bracket (15), enabling to position the wing (3) rotatably relative to the body (2) around the axis in which the wing is connected to the body (2) and located on the support element (8) so as to surround the support element (8).

6. The air vehicle (1) according to claim 1, comprising at least one control unit (17) that enables the control surface (4) to move between the open position (O) and the closed position (C) simultaneously by changing the attack angle of the wing (3) by triggering the main actuator (5) and the additional actuator (7).

7. The air vehicle (1) according to claim 1, wherein the main actuator (5) is a step motor.

8. The air vehicle (1) according to claim 1, wherein the additional actuator (7) is a linear actuator.

9. The air vehicle (1) according to claim 1, wherein the wing (3) is located in the nose region of the body (2) and acts as a canard.

10. An air vehicle (1) comprising:
a body (2),
a first wing (3) and a second wing 3 located on the body (2), the first wing (3) and the second wing (3) each creating a lifting force for flight of the body (2),
a first control surface (4) located on the first wing (3) and a second control surface (4) located on the second wing (3), the first control surface (4) movable along a direction in which the first wing (3) extends, the first control surface (4) having a first open position (O) in which the first control surface (4) moves out of the first wing (3) along the direction in which the first wing (3) extends and increases the lifting force acting on the body (2) and a first closed position (C) in which the first control surface (4) is moved from the first open position (O) and brought into the first wing (3), the second control surface (4) movable along a direction in which the second wing (3) extends and having a second open position (O) in which the second control surface (4) moves out of the second wing (3) along the direction in which the second wing (3) extends and increases the lifting force acting on the body (2) and a second closed position (C) in which the second control surface (4) is moved from the second open position (O) and brought into the second wing (3),
a main actuator (5) moving the first and second control surfaces (4) between the respective first and second open positions (O) and the respective first and second closed positions (C),
a shaft (6) enabling the first control surface (4) to be moved with triggering of the main actuator (5) and having one end connected to the first control surface (4),
a first additional actuator (7) enabling an attack angle of the first wing (3) to be changed by rotating the first wing (3) on the body (2),
a second additional actuator (7) enabling an attack angle of the second wing (3) to be changed by rotating the second wing (3) on the body (2),
a first support element (8) located on the first wing (3) and enabling the first wing (3) to be movably connected onto the body (2), a first opening (9) extending thoroughly within the first support element (8) and enabling the shaft (6) to trigger the first control surface (4),
a second support element (8) located on the second wing (3) and enabling the second wing (3) to be movably connected onto the body (2), a second opening (9) extending thoroughly within the second support element (8) and enabling the shaft (6) to trigger the second control surface (4),
wherein the first additional actuator (7) is located in connection with the first support element (8) and enables the first wing (3) to be rotated around the shaft (6) located within the first opening (9) by triggering the first support element (8), the shaft (6) rotating around an axis thereof along a direction in which the shaft (6) extends within the first support element (8) and extending from the first opening (9) towards the first control surface (4), enabling the first control surface (4) to be extended telescopically outward from the first wing (3) with the main actuator (5) triggering the first control surface (4) and thus enabling the first control surface (4) to be moved between the first open position (O) and the first closed position (C) irrespective of the additional actuator (7) triggering the wing (3); and
wherein the shaft (6) has a second end connected to the second control surface (4) to enable the second control surface (4) to be moved with triggering of the main actuator (5), wherein the first and second wings (3) are mutually located on the body (2), the shaft (6) rotating in the first and second openings (9) and triggering the first and second control surfaces (4), thereby enabling the first and second control surfaces (4) to perform a simultaneous telescopic motion and enabling respective attack angles of the first and second wings (3) to be changed around the axis of the shaft within the first and second openings (9) and the first and second wings (3) to be triggered independently of each other.

11. The air vehicle (1) according to claim 10, comprising:
a control unit (17) that enables the first and second control surface (4) to move between the respective first and second open positions (O) and the respective first and second open positions (C) simultaneously by changing the attack angle of the respective first and second wings (3) by triggering the main actuator (5) and the first and second additional actuators (7); and
wherein the shaft (6) moves the first and second control surfaces (4) by being triggered by the control unit (17) of the main actuator (5).

12. An air vehicle (1) comprising:
a body (2),
a first wing (3) and a second wing 3 located on the body (2), the first wing (3) and the second wing (3) each creating a lifting force for flight of the body (2),
a first control surface (4) located on the first wing (3) and a second control surface (4) located on the second wing (3), the first control surface (4) movable along a direction in which the first wing (3) extends, the first control surface (4) having a first open position (O) in which the first control surface (4) moves out of the first wing (3) along the direction in which the first wing (3) extends and increases the lifting force acting on the body (2) and a first closed position (C) in which the first control surface (4) is moved from the first open position (O) and brought into the first wing (3), the second control surface (4) movable along a direction in which the second wing (3) extends and having a second open position (O) in which the second control surface (4) moves out of the second wing (3) along the direction in which the second wing (3) extends and increases the lifting force acting on the body (2) and a second closed position (C) in which the second control surface (4) is moved from the second open position (O) and brought into the second wing (3), a main actuator (5) moving the first and second control surfaces (4) between the respective first and second open positions (O) and the respective first and second closed positions (C), a shaft (6) enabling the first control surface (4) to be moved with triggering of the main actuator (5) and having one end connected to the first control surface (4), a first additional actuator (7) enabling an attack angle of the first wing (3) to be changed by rotating the first wing (3) on the body (2), a second additional actuator (7) enabling an attack angle of the second wing (3) to be changed by rotating the second wing (3) on the body (2), a first support element (8) located on the first wing (3) and enabling the first wing (3) to be movably connected onto the body (2), a first opening (9) extending thoroughly within the first support element (8) and enabling the shaft (6) to trigger the first control surface (4), a second support element (8) located on the second wing (3) and enabling the second wing (3) to be movably connected onto the body (2), a second opening (9) extending thoroughly within the second support element (8) and enabling the shaft (6) to trigger the second control surface (4), wherein the first additional actuator (7) is located in connection with the first support element (8) and enables the first wing (3) to be rotated around the shaft (6) located within the first opening (9) by triggering the first support element (8), the shaft (6) rotating around an axis thereof along a direction in which the shaft (6) extends within the first support element (8) and extending from the first opening (9) towards the first control surface (4), enabling the first control surface (4) to be extended telescopically outward from the first wing (3) with the main actuator (5) triggering the first control surface (4) and thus enabling the first control surface (4) to be moved between the first open position (O) and the first closed position (C) irrespective of the first additional actuator (7) triggering the wing (3), a first worm gear (10) and a second worm gear (10) each located on the shaft (6), a first threaded channel (11) located in the first control surface (4) in a form fitting manner with the first worm gear (10) and a second threaded channel (11) located in the second control surface (4) in a form fitting manner with the second worm gear (10), wherein the first control surface (4) moves to the first open position (O) or the first closed position (C) by moving along the direction in which the first control surface (4) extends on the first wing (3) with the first worm gear (10) moving in the first threaded channel (11) as a result of the shaft (6) being triggered by the main actuator (5), wherein the second control surface (4) moves to the second open position (O) or the second closed position (C) by moving along the direction in which the second control surface (4) extends on the second wing (3) with the second worm gear (10) moving in the second threaded channel (11) as a result of the shaft (6) being triggered by the main actuator (5), and wherein the first and second worm gears (10) trigger the respective first and second control surfaces (4) mutually located on the body (2) and thereby enable the first and second control surfaces (4) to simultaneously switch only to the respective first and second open positions (O) or only to the respective first and second closed positions (C) and being located in an opposite direction with respect to each other on the shaft (6) for the first and second control surfaces (4).

\* \* \* \* \*